United States Patent Office 2,771,499
Patented Nov. 20, 1956

2,771,499

ELECTRIC BATTERY PLATE AND METHOD OF PRODUCING THE SAME

Arthur Fleischer, Northampton, Mass., assignor to Nickel Cadmium Battery Corporation, Easthampton, Mass., a corporation of Delaware No Drawing. Application December 9, 1952,
Serial No. 325,037

10 Claims. (Cl. 136—24)

This invention relates to an electric battery plate and method of producing the same, and more particularly to an impregnated sintered plate for use in alkaline storage batteries of the nickel-cadmium type, especially the negative plate thereof.

It is an object of the invention notably to extend the life and enhance the capacity of such a plate so that it will maintain its functional efficiency throughout a prolonged series of charge and discharge cycles.

Another object is to provide such a plate of which the functional capacity tends to increase as the charge and discharge cycles progress.

Another object is to attain the beneficial results just stated without requiring dimensional change in the plate, and without materially increasing its cost of production or materially complicating the procedure involved in its production.

Another object is to provide a method of producing such a plate which is effective regardless of the particular form in which the cadmium is used when impregnating the plate, and in which the indium may be mixed with the cadmium for the impregnating step, as hereinafter described.

A further object consists in providing certain improvements in materials employed and in steps followed whereby the above named and other objects inherent in the invention may be efficiently attained.

Generally speaking, the invention consists in the discovery that the addition of a quantity of indium to its active material preserves the life and improves the functional effect or capacity of the plate when subjected to repeated charging and discharging; and in the provision of a method of producing the plate with the indium incorporated therein.

Sintered negative plates for nickel-cadmium alkaline storage batteries as well as means and method for producing them are not unknown to operatives familiar with this industry, but it is deemed desirable here to set forth with some detail the method and product of the present invention in order that its features of novelty and advantage may be discerned and appreciated.

At the outset a suitable sintering mold is provided, preferably composed of graphite and consisting of a body portion and cover having holes and pins or dowels for aligning them in closed position. The body portion is hollowed or chambered to form a cavity slightly greater in length and width than the corresponding designed dimensions of the plate to be molded therein to allow for trimming, and also slightly deeper than the designed thickness of the plate to allow for shrinkage.

A quantity of carbonyl nickel powder, preferably of a fineness such that it will pass through a 200 mesh screen, is obtained and fed into the mold cavity until the latter is approximately half full. This layer of powder is scraped level and thereon is placed a grid of suitable material and form to reinforce the plate against subsequent dishing or buckling, and shrinking in length or width. I have found a grid composed of 20 mesh pure nickel wire cloth to be highly satisfactory, although other kinds, exampled by but not limited to, a thin perforated or reticulated nickel or nickel plated steel sheet, or a nickel or nickel plated steel frame carrying nickel or nickel plated steel wire cloth may be substituted, if desired. It is well not to have the openings finer than 20 mesh in order that the subsequent sintering will lock the grid in position by bridging of the powder on both sides of the grid through the openings. The nickel wire cloth, if used, should be welded at the corners to prevent fraying, or the like, and also welded at several spots within its edges; and it is also well to anneal the grid in a protective atmosphere such as dissociated ammonia for, say, thirty minutes at about 1700° F. and then flatten the same as by hydraulic pressure, 5,000 lbs. per square inch being satisfactory, in order to eliminate unevenesses, following which the edges and corners may be trimmed, if necessary.

After the grid has been positioned on the powder in the mold, the latter is filled with more of the powder, taking care to fill all the grid meshes, the powder is smoothed off to be level with the top of the mold cavity, and the mold cover is pinned in place.

The mold is then carefully placed in a sintering furnace, 8 kilowatt being suitable, which is provided with a cooling chamber and with means for maintaining a protective atmosphere, i. e., dissociated ammonia. An initial furnace temperature of 1700° F. and treatment for ten minutes are satisfactory; whereupon the mold is transferred to the cooling chamber and left therein for say thirty minutes, removed, trimmed to remove unevennesses, if present, measured and weighed. Further steps are taken to physically prepare the plate for assembly in a battery which need not be described as they constitute no part of the present invention.

The next procedure in the production of the plate is the impregnation thereof with active material which involves the steps of soaking or steeping the plate in a solution of metal, cathodic polarization of the plate, washing and drying; the said group or series of steps being repeated until the desired result is achieved, four repetitions having been found usually to be adequate.

The soaking or steeping is conducted in a suitable vessel such, for instance, as an inverted bell jar, having an inlet for the solution and means for establishing a vacuum within the vessel. If more than one plate is to be treated, they may be placed in a container, perferably plastic, and be separated by glass elements to permit circulation of the liquid. After placing the plate or plates in the bell jar and closing the latter, a vacuum is generated therewithin, a degree of below 4 millimeters producing the desired effect. The solution of metal is then introduced and the plate or plates permitted to soak or steep therein for the necessary period, approximately five minutes generally sufficing. At the termination of this period the vacuum is broken, air at normal atmospheric pressure is admitted, and the plate or plates removed from the bell jar for the next treatment.

Turning now to the impregnating solution itself, which is directly related to the dominant feature of this invention, the same may be described as a mixture of cadmium and indium, preferably in the form of cadmium nitrate or cadmium acetate and indium nitrate, and with the proportion of indium relatively small as compared with the cadmium, e.g., the indium content amounting to from a fraction of one percent to two percent of the cadmium content, although it is not here intended to exclude greater proportions of indium.

A batch of the cadmium nitrate solution may be made as follows: mix 10,650 milliliters of concentrated nitric acid (70% $HNO_3$ by weight and a specific gravity of 1.42) with 6,750 milliliters of de-ionized water in a cylindrical glass vessel approximately 18 inches high and 12 inches in diameter fitted with glass stirring means such as a shaft with propeller, following which the temperature of the mixture will rise to about 50°–60° C. Then add small amounts (e.g. 200–300 grams) of cadmium oxide at intervals during a period of two to three hours, the rate of addition being controlled so that the temperature of the stirred mixture does not exceed 80° C., and the total amount added equalling 10,600 grams which will be consumed in reducing the acid content to the desired titer or concentration of 3–4 grams of $HNO_3$ per liter. The resultant mixture is filtered, preferably using a vacuum filter with Orlon filter cloth in combination with paper, and the clear filtrate will be found to have a specific gravity of approximately 1.78, a content of 480–500 grams of cadmium per liter, a volume of approximately 18 liters, and to be saturated with respect to $Cd(NO_3)_2 \cdot 4H_2O$ at room temperature. In preparing this solution, the volume of water and the temperature of reaction are prescribed for yielding the desired composition, and proportions of the ingredients should be modified when using other sized vessels with different radiation surfaces.

In case it should be preferred to use a cadmium acetate solution, a batch thereof may be prepared by adding 5.28 liters of concentrated acetic acid (99.5%) to 5.57 liters of de-ionized water in a suitable glass vessel fitted with a glass stirrer. The mixture is warmed by the exothermic heat of reaction to about 70° C. although, if desired, this rise in temperature may be hastened by preheating the acid, and 5.65 kilograms of cadmium oxide are added in small amounts at intervals during a period of two to three hours, the rate of addition being dictated by disappearance of the brown cadmium oxide. At the end of this period of reaction the mixture will have a free acid content of approximately 30 grams of $CH_3COOH$ per liter or less. The solution is then filtered while still warm, perferably by vacuum with Orlon cloth and tight paper, the rate of filtration varying with the amount and kind of impurity traces in the cadmium oxide, and the resultant yield will be about 9 liters containing approximately 450 grams of cadmium per liter.

The preparation of indium nitrate solution may proceed as follows; place 927 milliliters of concentrated nitric acid (70% $NHO_3$) in a two liter Erlenmeyer flask, warm the same gently to a temperature of 40°–60° C. and add about 6 to 10 small pieces (e.g. ¼ inch x ¼ inch ⅛ inch) of indium metal which can be obtained in bars and cut up. Shake the flash gently and the start of reaction will be made evident by the generation of brown fumes, so that it is advisable to operate in a well vented hood. Continue the addition of small batches of the indium during a period of four to six hours, avoiding the use of batches sufficiently large to cause a violent reaction, until a total of 281 grams has been added. Then permit the mixture to stand for about twelve hours, and thereafter subject it to stirring in vacuum to eliminate the nitrogen dioxide content, continuing the stirring until the solution is colorless or has only a faint yellow tinge, when it will be found to have a concentration of approximately 400 grams of indium per liter.

For the purpose of impregnating the plate or plates with the solution of metal by soaking or steeping therein, as hereinabove described, the indium nitrate solution is mixed with either the cadmium nitrate or cadmium acetate solution in such proportion that the amount of indium equals from a fraction of one percent to two percent of the amount of cadmium, by weight. The solution containing indium is introduced into the bell jar for the soaking operation as described above. The solution fills the pores of the sintered plate, and in the subsequent operation of cathodic polarization the metallic constituents are converted to a solid form. The solid compounds of cadmium and indium are converted to the metallic state on charging the battery in which the plates are used and constitute the active material of the negative plate. If cadmium nitrate is used in the mixture, there may be a tendency to interaction between the nitrate and the nickel component of the plate which can affect the composition of the solution within the pores, and this interaction can be controlled and its violence decreased by the addition of a suitable inhibitor to the solution, such as disclosed in United States Patents No. 1,816,860 and No. 2,051,218, at a concentration of approximately one gram per liter.

The impregnating solution is perferably used at a temperature of 75°–80° F. and, after the soaking has continued for, say, five minutes, the vacuum is broken, air at normal pressure admitted, as hereinabove set forth, and the plate or plates removed from the bell jar for the next step of cathodic polarization, which will now be described.

This polarization consists generally of an electrolysis in an appropriate alkaline solution (e. g. 25% potassium hydroxide) using the plate as a cathode with a nickel anode. The effect of the electrolysis is to evolve hydrogen at the cathode and cause precipitation of cadmium as metal or hydroxide or a mixture thereof, together with the reduction of nitrate ion to ammonia and the migration of nitrate and other anions from the pores of the plate.

More specifically, I choose to arrange several open-top, rectangular nickel containers in line on an insulated support with small spaces (e. g. one-half inch) between them. A side of one of the end containers is connected to the positive terminal of a source of direct current that is preferably fitted with switches, adjustable resistances and meters; while the container at the other end has a connector insulated from its wall and joined to the negative terminal of the current. In each container a plate is positioned by a suspension clip which holds the plate substantially equidistant from the container walls, and each clip is connected with a wall of an adjacent container to establish a series circuit. The alkaline solution is heated to approximately 100° C. in a nickel vessel having as many spouts as there are plate containers, and the solution is poured simultaneously into the latter until it covers the plates. As soon as the solution reaches the plates the electric circuit is closed and electrolysis commences, care being taken to avoid excessive current during filling. This closing of the current as soon as the solution reaches the plates serves to prevent efflorescence of cadmium hydroxide resulting from interaction of the alkali solution and the cadmium solution in the pores of the plates. After the solution has covered the plates pouring is stopped and the polarization is continued at a constant current for approximately twenty minutes, during which time the voltage rises, and after which the current is opened and the plates are removed from the containers for the next step which is washing. The current employed during polarization may, with satisfaction, have a density of from 0.2 to 0.5 ampere per square inch of plate surface including both sides.

The washing of the polarized plates is for the purpose of removing the remaining alkali solution which contains residual salts acquired from the previous soaking or steeping of the plates, and may be conveniently carried out with the plates arranged in separated position in a plastic vessel and subjected to a flow of cold tap water for 8–10 hours. The attainment of the desired washing effect may be determined by removing a plate from the vessel and testing its drip for pH.

After washing, the plates are transferred to the rack of a low temperature air drying oven and permitted to remain for about 36 hours in an air temperature of 120°–140° F. In case it is desired to shorten the drying time, higher temperatures may be used, e. g. 170°–180° F.

The drying step completes the impregnation treatment, and the series or cycles of the four steps (i. e., soaking, cathodic polarization, washing and drying) is repeated preferably four times to obtain the best result; although resort may be had to less or even more treatments under particular circumstances.

If cadmium acetate is used in the impregnating solution, in place of cadmium nitrate, the method of procedure may be as above described, but the inflow to the bell jar will be slowed in the case of the cadmium acetate because it has a higher viscosity than cadmium nitrate, and there is no interaction between the cadmium acetate and the nickel component of the plate although a mixture of acetic acid and water is derived. It should also be noted that the impregnating solution containing cadmium acetate yields an active material in the plate in the form mainly of cadmium metal rather than cadmium hydroxide.

The adaptability of these plates, which have been treated with a solution containing indium that is the characteristic feature of this invention, for use in batteries is similar to that of plates treated with cadmium nitrate or cadmium acetate solutions, without indium, and they may be handled and employed in the same way which is known to those skilled in this field and need not be described. However, there is, as already stated, a marked and notable difference in their performance, as the plates treated with a solution containing indium are, speaking in round terms, from fifty to one hundred percent more durable and efficient, especially in that their life is prolonged and their capacity through cycles of discharging and charging is maintained, and, indeed, in many cases increased.

While the foregoing description has presented the invention as applied to sintered plates for alkaline nickel-cadmium batteries, it is also applicable to the pocket type plate of such batteries, and, I believe to silver peroxide-zinc, mercury oxide-zinc, cuprous oxide-zinc or magnesium batteries, as well as other kinds; the important feature involving the inclusion of indium in the active material of the plate.

I further desire it to be understood that various changes may be resorted to in the materials employed, steps followed, including conditions, and in the order of the steps, without departing from the spirit or scope of the invention; and hence I do not intend to be limited to details herein set forth except as they may be included in the claims or be required by disclosures of the prior art.

What I claim is:

1. A secondary electric battery comprising a porous, active material carrier composed essentially of nickel and having functionally active material within its pores consisting essentially of cadimum with a minor portion of indium.

2. A secondary electric battery comprising a porous, active material carrier composed essentially of nickel and having functionally active material within its pores consisting essentially of cadium with a portion of indium amounting up to 5% of the amount of cadmium.

3. A secondary electric battery comprising a porous, active material carrier composed essentially of nickel and having functionally active material within its pores consisting essentially of cadmium with a portion of indium amounting to between ½% to 2% of the amount of cadmium.

4. A secondary electric battery comprising a sintered porous, active material carrier composed essentially of nickel and having functionally active material within its pores consisting essentially of cadmium with a minor portion of indium.

5. A secondary electric battery comprising a porous, metallic carrier for active material, said carrier having functionally active material within its pores consisting essentially of cadmium with a minor portion of indium.

6. A secondary electric battery comprising a sintered porous metallic carrier having functionally active material within its pores, said active material consisting essentially of cadmium with a minor portion of indium.

7. A method of producing a secondary battery plate consisting essentially of the following steps: provided a suitable metal body to constitute the base of such plate; and treating the body with a solution consisting essentially of a cadmium compound taken from the group consisting of cadmium nitrate and cadmium acetate; there being also a minor portion of indium nitrate in the solution, together with an inhibitor taken from the group consisting of an acid derivative of a reaction product of thiourea and an aldehyde ammonia.

8. A method of producing a secondary battery plate consisting essentially of the following steps: providing a suitable metal body to constitute the base of such plate; and treating the body with a solution consisting essentially of a cadmium compound taken from the group consisting of cadmium nitrate and cadmium acetate; there being also a portion of indium nitrate in the solution in the proportion of ½% to 2% by weight of indium as compared to the amount by weight of cadmium, together with an inhibitor taken from the group consisting of an acid derivative of a reaction product of thiourea and an aldehyde ammonia.

9. A method of producing a secondary battery plate consisting essentially of the following steps: providing a suitable nickel body to constitute the base of such plate; and treating the body with a solution consisting essentially of a cadmium compound taken from the group consisting of cadmium nitrate and cadmium acetate; there being also a minor portion of indium nitrate in the solution, together with an inhibitor taken from the group consisting of an acid derivative of a reaction product of thiourea and an aldehyde ammonia.

10. A method of producing a secondary battery plate consisting essentially of the following steps: providing a suitable sintered nickel body to constitute the base of such plate; and treating the body with a solution consisting essentially of a cadmium compound taken from the group consisting of cadmium nitrate and cadmium acetate; there being also a portion of indium nitrate in the solution in the proportion of ½% to 2% by weight of indium as compared to the amount by weight of cadmium, together with an inhibitor taken from the group consisting of an acid derivative of a reaction product of thiourea and an aldehyde ammonia.

References Cited in the file of this patent

UNITED STATES PATENTS

| | | |
|---|---|---|
| 1,373,733 | Hubbell | Apr. 5, 1921 |
| 1,960,740 | Gray | May 29, 1934 |
| 2,157,933 | Hensel | May 9, 1939 |
| 2,182,380 | Hensel | Dec. 5, 1939 |
| 2,672,494 | Fleischer | Mar. 16, 1954 |
| 2,683,184 | Boswell | July 6, 1954 |